United States Patent

[11] 3,622,301

[72] Inventors Ernest Mehl;
Bauke Weizenbach; Paul Kawulka, all of Fort Saskatchewan, Alberta, Canada
[21] Appl. No. 1,898
[22] Filed Jan. 9, 1970
[45] Patented Nov. 23, 1971
[73] Assignee Sherritt Gordon Mines Limited
Toronto, Ontario, Canada

[54] TREATMENT OF NICKEL CONTAINING MATERIAL TO REMOVE MOLYBDENUM
5 Claims, No Drawings
[52] U.S. Cl. .................................... 75/3,
75/84, 75/121
[51] Int. Cl. ............................................ C22b 3/00,
C22b 49/00
[50] Field of Search ............................................. 75/24, 84, 119, 121, 3

[56] References Cited
UNITED STATES PATENTS

| | | | |
|---|---|---|---|
| 2,796,344 | 6/1957 | Brennan ...................... | 75/121 |
| 2,904,430 | 9/1959 | Taylor et al. .................. | 75/84 X |
| 3,293,027 | 12/1966 | Mackin et al. ................ | 75/121 X |
| 3,314,783 | 4/1967 | Zimmerley et al. ........... | 75/24 X |

*Primary Examiner*—Allen B. Curtis
*Attorneys*—Frank I. Piper and Arne I. Fors

ABSTRACT: A process for treating molybdenum contaminated nickel, iron and sulfur containing mattes, intermediates and residues to remove the molybdenum. The material in finely divided form is mixed with alkali and water and pelletized. The pellets are then roasted in air to convert the molybdenum into soluble alkali molybdate which is then leached from pellets with water.

TREATMENT OF NICKEL CONTAINING MATERIAL TO REMOVE MOLYBDENUM

This invention relates to a method of treating molybdenum containing nickel bearing mattes, intermediates and residues to permit recovery of nickel values substantially free from molybdenum contamination. More specifically, the invention relates to a pelletizing, roasting and leaching process for treating nickel containing mattes, intermediates and residues which contain, in addition to molybdenum, iron and sulfur and optionally copper and cobalt as the main constituents in which the molybdenum values are separated by extraction and dissolution in leach solution and nickel and any cobalt and copper are recovered in the leach residue. This residue can then be further processed by hydrometallurgical methods for the recovery of nickel, cobalt and/or copper.

There are various mattes, residues, intermediates and the like materials which constitute potentially valuable sources of nickel and other nonferrous metals such as copper and cobalt. Hydrometallurgical processes have been proposed for treating such materials for the separate recovery of the desired nickel, cobalt and copper in a substantially pure form. For example, such materials may be leached in aqueous ammoniacal ammonium sulfate or sulfuric acid solutions at elevated temperatures and under an oxygen overpressure to extract nickel, cobalt and copper values which can then be recovered from the leach solution. However, where these materials also contain molybdenum values, as is commonly the case, at least a portion of such values is extracted with the nickel, cobalt and copper values. This causes processing problems and results in a contamination of the nickel product with molybdenum.

It is known that molybdenum can be extracted from molybdenite ($MoS_2$) by mixing it with sodium hydroxide solution, then roasting the material to drive off substantially all the sulfur as sulfur dioxide leaving molybdenum values in the form of molybdenum trioxide ($MoO_3$). The roasted material is then slurried in water and the molybdenum trioxide is leached from the material. However, serious problems are encountered when this method is applied to extract molybdenum from mattes, residue and intermediates which also contain nickel, iron and sulfur, and optionally cobalt and copper, as the main constituents in that it is difficult to completely and individually oxidize each of these additional elements. Instead, stable intermetallic compounds with molybdenum are created which prevent complete extraction of the molybdenum with sodium hydroxide. Also, such materials, when mixed with sodium hydroxide solution and roasted, become extremely sticky and adhere to the roaster parts after solidifying. The roasted material can only be removed from the container with great difficulty and losses are high. The handling problem is so serious that the method is commercially impractical.

It is accordingly an object of the present invention to provide an economic and efficient process for treating nickel containing mattes, intermediates and residues which contain, in addition to nickel, iron and sulfur, molybdenum and optionally copper and cobalt to permit the recovery of nickel and any copper and cobalt values substantially free from molybdenum and other caustic soluble contaminants.

Another object of this invention is to provide a method of pretreating such material so that when it is leached in water, substantially all the molybdenum and other elements soluble in caustic, e.g. tungsten and silica will dissolve therein and the nickel and any cobalt and copper values will remain substantially undissolved.

These and other objects may be accomplished by a process for treating nickel, iron and sulfur containing mattes, intermediates and residues which material also contains molybdenum as a contaminant to remove said contaminant therefrom which comprises the steps of: mixing finely divided particles of said material with an alkali provided in an amount equivalent to a feed material to sodium hydroxide weight ratio in the range of from about 20:1 to about 3:1, adding sufficient water to the mixture of the said material and said alkali to encourage and promote the agglomeration of said mixture into pellets, pelletizing said mixture; roasting the resulting pellets in contact with oxygen at a temperature within the range of about 1000° F. to 1600° F. for a time sufficient to convert substantially all said molybdenum values into soluble alkali metal molybdates, quenching said roasted pelletized mixture in water and agitating the resulting slurry to extract and dissolve the soluble molybdenum values in solution; separating the solution from the residue and recovering said residue and contained nickel values substantially free from molybdenum contamination.

The process of the invention is applicable to any mattes, residues, intermediates or the like materials which contain molybdenum together with iron, sulfur and economically recoverable amounts of nickel, cobalt and/or copper which can be extracted from the material by leaching in aqueous acid or ammoniacal solutions. The process is most advantageously applied to low sulfur mattes obtained by melting nickel alloy scrap, mixing the scrap melt with sulfur or pyrite and then atomizing or shotting it to provide a dry granulated material. Such materials typically contain: (wt. %) Ni—30–40, Co—1–10, Cu—1–10, Fe—20–40, S—5–10, Cr—5–10, W—0–1 and Mo—3–10.

In carrying out the invention, the starting material of a particle size substantially 100 percent minus 10 mesh and preferably 48 mesh standard Tyler screen is blended with a quantity of alkali to form a homogeneous mixture and the mixture is passed to a pelletizer.

If the starting material has been wet ground, it must be dried before it is mixed with alkali otherwise the mixture contains too much water for pelletizing.

The mixture preferably is pelletized in a rotating drum or rotating disc-type pelletizer, using conventional pelletizing procedures. Preferably pellets are screened to minus one-half inch plus 8 mesh. Oversized pellets are crushed and returned together with undersize pellets to the pelletizer. The amount of water added in the pelletizing operation will depend on the nature of the starting material, particularly its particle size, and the form of pellets desired, but preferably should be in the range of about 1 to about 5 percent by weight.

The amount of alkali which is added to the starting material may vary over wide limits. Where use is made of sodium hydroxide, the preferable weight ratio of starting material to the total amount of alkali is in the range of 20:1 to 3:1. As the ratio approaches 20:1, more molybdenum will remain with the desired metal values. Thus, the amount of alkali will depend largely upon the amount of molybdenum which can be tolerated as a contaminant in the end product. Stoichiometrically equivalent amounts of other alkalis may be substituted for sodium hydroxide.

Alkalis suitable for mixing with the starting material include sodium hydroxide, sodium carbonate, sodium sulfide, potassium hydroxide, potassium carbonate or mixtures thereof. Preferably, use is made of sodium hydroxide.

In order to ensure the efficient operation of the present invention, the alkali should be uniformly disseminated throughout the mixture. The starting material and alkali may be mixed more efficiently and economically during comminution of the starting material than during the pelletizing operation, therefore, a substantial part of the alkali should be added prior to pelletizing. It is preferably, therefore, to add up to 80 percent of the required amount of alkali dry to the starting material before pelletizing and the balance as an alkali solution during the pelletizing step.

The pellets from the pelletizing step are charged into a furnace and roasted at a temperature within the range of from about 1000° F. to about 1600° F., preferably at about 1400° F. Roasting may be effected in any conventional apparatus such as a moving belt furnace or a tray furnace. However, preferably use is made of a direct fired rotary kiln. During the roasting operation, the pellets are contacted with oxygen, preferably by directing a constant flow of air onto them. The purpose of the roasting operation is to convert the molybdenum values in the pellets to molybdenum trioxide ($MoO_3$), which combines with the alkali to form a water soluble molybdate. Where use is made of sodium hydroxide, the molybdenum trioxide will combine therewith to form sodium molybdate. Preferably, roasting is continued until substantially all the molybdenum values have been oxidized and combined with available alkali. In most cases, the retention time will be within the range of about 10 minutes to about 2 hours.

During the first few minutes of the roasting operation, an exothermic reaction causes the pellets to burn with a visible white flame. The temperature of the pellets may be considerably higher than that within the furnace. For example, in one case when the temperature within the furnace was 1400° F., the temperature of the pellets during the first 5 minutes of the roasting operation was approximately 1780° F.

Upon completion of the roasting operation, the hot pellets are removed from the furnace and quenched by immersion in water. The resulting slurry is rapidly agitated to induce disintegration of the pellets and dissolution of the soluble sodium molybdate values. The quenching and dissolution operations proceed rapidly and the liquid portion may be separated from the residue after a few minutes. Liquid-solids separation may be accomplished by conventional means such as filtration. The solution may be treated for the recovery of molybdenum and the solid residue, which contains all the nickel values as well as iron values and any cobalt and copper contained in the starting material, may be treated in a conventional ammoniacal ammonium sulfate or sulfuric acid leach under oxidizing conditions to extract the contained nickel, cobalt and copper values.

The invention is further explained by the following example which is intended as illustrative only and not by way of limitation.

The starting material was a shotted matte prepared from high temperature resistant nickel alloy scrap which was heated to a molten state and mixed with a small quantity of sulfur. The molten mixture was shotted by pouring the material past jets of water. The resulting matte analyzed: Ni—35.0 percent, Co—3.5 percent, Cu—7.5 percent, Fe—26.1 percent, S—6.2 percent, Cr—6.4 percent, W—0.19 percent and Mo—7.1 percent.

Samples of shot were wet ball-milled to 100 percent minus 48 mesh and dried. The material was transferred to a disc pelletizer and various quantities of sodium hydroxide or sodium carbonate solution were added thereto during the pelletizing operation. The pellets were transferred to a wire basket and suspended in a flowing air atmosphere in a vertical tube-furnace maintained at 1400° F. After heating for a period of 30 or 120 minutes, the basket and contents were taken out of the tube and pellets poured into a container of water. The quenched disintegrated pellets were then vigorously agitated for approximately 1 minute and filtered. The volume of filtrate and wash water was measured and the residue was dried for analysis. The results are set out in the following table.

TABLE 1

| Retention time | Green pellet weight | Mo free residue weight | Wash water volume | Percent Ni in residue | Percent Mo in residue | Grams Mo in wash water | Ratio shot/ NaOH | Percent NaOH as Na₂CO₃ | Percent Extract Mo | Percent Extract W |
|---|---|---|---|---|---|---|---|---|---|---|
| 30 minutes retention time | 208 | 188 | 1,400 | 31.3 | 2.45 | 7.3 | 22 | 0 | 61 | |
|  | 306 | 210 | 1,280 | 30.3 | 1.90 | 9.2 | 15.5 | 10 | 70 | |
|  | 242 | 208 | 1,250 | 30.2 | 1.35 | 9.8 | 15.5 | 21 | 78 | |
|  | 221.5 | 174 | 1,100 | 32.0 | .35 | 10.9 | 7.4 | 55 | 97 | |
|  | 150 | 128 | 1,100 | 30.5 | .14 | 8.27 | 4.6 | 0 | 98 | 88 |
| 120 minutes retention time | 199 | 179 | 1,200 | 25.7 | 1.82 | 5.76 | 15.5 | 21 | 63.5 | 47 |
|  | 189 | 131 | 1,300 | 36.0 | .27 | 9.35 | 7.4 | 55 | 96.5 | |
|  | 178 | 132 | 810 | 27.9 | .09 | 7.29 | 4.6 | 47 | 98.5 | 84 |
|  | 311 | 297 | 1,000 | 31.4 | .10 | 15.5 | 4.6 | 0 | 98.5 | |

The results show that a retention time of from about 30 minutes to about 120 minutes favors satisfactory molybdenum extraction. It can be seen also that optimum Mo extraction is obtained at feed/NaOH weight ratios of 4.6 and 7.4. Extractions drop off as the ratio is increased to 22. The results also show that a major portion of the tungsten is extracted and separated from the nickel values by the method of the invention.

What we claim as new and desire to protect by Letters Patent of the United States is:

1. A process for treating nickel, iron and sulfur containing mattes, intermediates and residues which feed material also contains molybdenum as a contaminant to remove said contaminant therefrom which comprises the steps of: mixing finely divided particles of said material with an alkali provided in an amount equivalent to a feed material to sodium hydroxide weight ratio in the range of from about 20:1 to about 3:1; adding sufficient water to the mixture of the said material and said alkali to encourage and promote the agglomeration of said mixture into pellets, pelletizing said mixture, roasting the resulting pellets at a temperature within the range of about 1000° F. to about 1600° F. in contact with oxygen for a time sufficient to convert substantially all said molybdenum values into soluble alkali metal molybdates, quenching said roasted pelletized mixture in water and agitating the resulting slurry to extract and dissolve the soluble molybdenum values in solution; separating the solution from residue, and recovering said residue and contained nickel values substantially free from molybdenum contamination.

2. The process as claimed in claim 1 wherein up to 80 percent by weight of the quantity of alkali mixed with said material is mixed in a dry state and the balance of said alkali is dissolved in the water which is added to said mixture to encourage and promote the agglomeration of said mixture into pellets.

3. The process as claimed in claim 2 wherein said alkali is selected from the group comprising sodium hydroxide, sodium carbonate, sodium sulfide, potassium hydroxide, potassium carbonate and mixtures thereof.

4. The process as claimed in claim 1 wherein said pelletized mixture is roasted in air at a temperature of about 1400° F.

5. The process as claimed in claim 1 wherein said pelletized mixture is roasted in air at a temperature of about 1400° F. for a period of from about 30 minutes to about 120 minutes.

* * * * *